June 15, 1926.
W. H. FIRARI
1,589,060
DRAWBAR CLUTCH CONTROL
Filed June 26, 1925
Fig. 1.
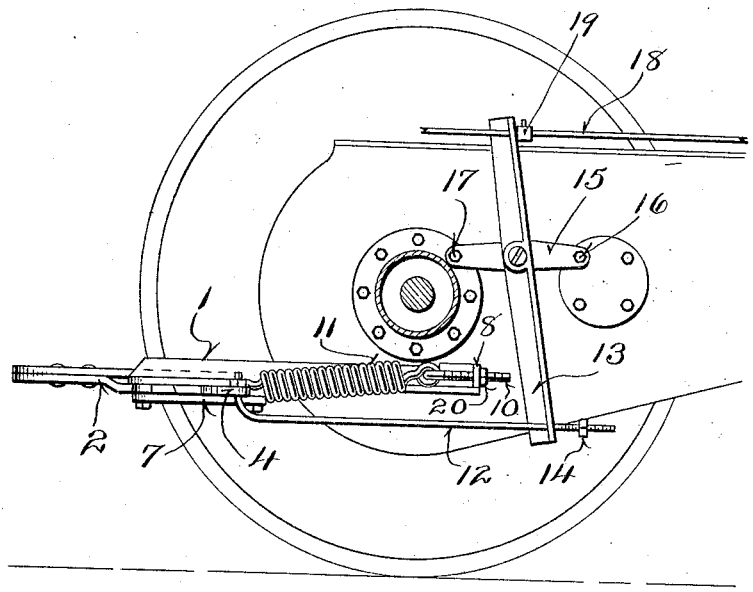
Fig. 2.
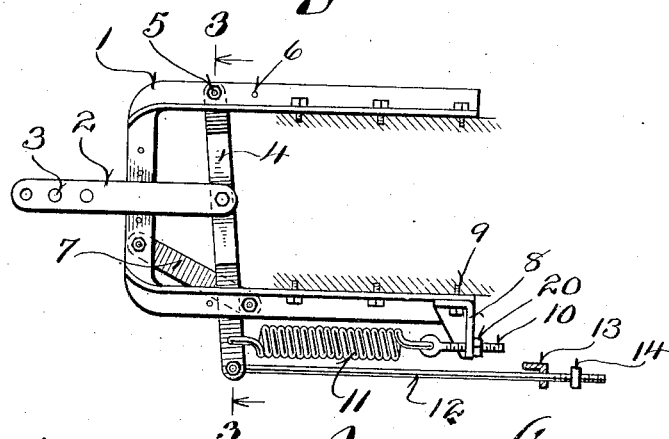
Fig. 3.
Inventor
William H. Firari
By
Attorneys Patented June 15, 1926.

1,589,060

UNITED STATES PATENT OFFICE.

WILLIAM H. FIRARI, OF NORTH LOWELL, WISCONSIN.

DRAWBAR CLUTCH CONTROL.

Application filed June 26, 1925. Serial No. 39,711.

This invention relates to a draw bar clutch control which is primarily designed for use with tractors.

Objects of this invention are to provide a draw bar clutch control which may be readily associated with a standard tractor to control the clutch of the tractor and to thus limit the stresses imposed by opening the clutch when a predetermined draw bar pull has been reached, so that no harmful results will follow, although the tractor may be hitched to a larger load than it is designed to handle.

Further objects are to provide a device which is readily adapted for attachment to a standard tractor without requiring modification of the tractor, and which is of simple and sturdy construction and is not likely to get out of order.

Further objects are to provide a device which may be attached to the standard tractor in a manner to utilize the bolt holes and parts of the tractor so that no additional holes need be drilled.

An embodiment of the invention is shown in the accompanying drawings, in which:—

Figure 1 is a sectional elevation of the rear portion of a tractor.

Figure 2 is a fragmentary plan view of the draw bar and support with the parts attached thereto.

Figure 3 is a sectional view on the line 3—3 of Figure 2.

The tractor upon which the device is attached is of a standard type such as that known as the John Deere tractor, although the device is adapted for use with other types of tractors.

Referring to the drawings, it will be seen that the usual draw bar support 1 is employed to support the relative short draw bar 2 which is in reality a link apertured, as indicated at 3 for attachment to the load. The forward end of this draw bar is pivoted to an intermediate point of a lever 4, such lever being pivoted by means of a bolt 5 to one side of the draw bar yoke 1. It is to be understood that one of the holes 6 provided as a standard construction of this tractor, is employed for the reception of the bolt 5. The other end of the lever 4 passes below the other side of the yoke 1 and is supported by means of a diagonal strap 7 bolted to the under side of and spaced from the draw bar yoke.

It is to be understood that the strap 7 has the bolts thereof passed through the holes regularly found in these draw bar yokes. A bracket 8 is bolted by means of one of the standard bolts 9 to the body portion of the tractor and to the front end of one of the yoke arms. This bracket carries an adjustable eye bolt 10 which in turn carries one end of the relatively heavy tension spring 11. The other end of the tension spring is connected with the lever 4 and tends to hold such lever in its forward position. The lever 4 has bolted to its free end a rod 12. This rod passes through the lower end of a vertical lever 13, such lever being preferably L-shaped in cross section. The outer end of the rod 12 is threaded and an adjusting nut 14 is screwed thereon to regulate the point at which the lever 13 will be rocked. The lever 13 is pivoted to a cross piece 15 (see Figure 1) which is bolted to the tractor by means of the standard bolts 16 and 17. The upper end of the lever is apertured and freely receives the clutch rod 18. This clutch rod is provided with an adjustable slot 19 locked thereon and adapted to be engaged by the lever 13 when the lever is rocked in a clockwise direction.

The operation of the apparatus is as follows:—When a load is placed upon the draw bar 2, the lever 4 is moved a distance proportionate to the load. When, however, the load stresses the spring 11, a sufficient amount and exceeds a predetermined value, the nut 14 of the rod 12 engages the lower end of the lever 13 and opens the clutch through the clutch rod 18. The tension of the spring 11 may be regulated by adjusting the nut 20 on the eye bolt 10.

It will be seen, therefore, that a spring controlled draw bar has been provided for tractors which will limit the amount of tractive effort transmitted through the draw bar, and which will open the clutch when the pull of the tractor exceeds a predetermined value, and thus protects the entire apparatus from damage due to excessive loads.

It will be seen further that under normal conditions of loading, the tractor operates in the usual manner with, however, the addition of a cushioned draw bar.

Although the invention has been described in considerable detail, it is to be understood that the invention may be variously embodied and is, therefore, to be limited only as claimed.

I claim:

The combination of a tractor, a bearing secured thereto, a vertical lever pivoted to said bearing, a control rod slidably mounted in the upper end of said lever, a stop carried by said control rod against which said lever is adapted to contact, a horizontal lever having one end pivoted to said tractor, a spring connected adjacent the outer end of said horizontal lever, a rod connecting said vertical lever and said horizontal lever, a draw bar pivoted intermediate the ends of said horizontal lever, and a strap bolted to said tractor and supporting the free end of said horizontal lever.

In testimony that I claim the foregoing I have hereunto set my hand at Reeseville, in the county of Dodge and State of Wisconsin.

WILLIAM H. FIRARI.